(12) United States Patent
Choi

(10) Patent No.: US 7,313,006 B2
(45) Date of Patent: Dec. 25, 2007

(54) SHOOT-THROUGH PREVENTION CIRCUIT FOR PASSIVE LEVEL-SHIFTER

(75) Inventor: Hwangsoo Choi, Fullerton, CA (US)

(73) Assignee: Microsemi Corporation, Irvine, CA (US)

( * ) Notice: Subject to any disclaimer, the term of this patent is extended or adjusted under 35 U.S.C. 154(b) by 51 days.

(21) Appl. No.: 11/183,554

(22) Filed: Jul. 18, 2005

(65) Prior Publication Data
US 2006/0256589 A1 Nov. 16, 2006

Related U.S. Application Data

(60) Provisional application No. 60/680,883, filed on May 13, 2005.

(51) Int. Cl.
*H02H 7/122* (2006.01)
*H05B 41/36* (2006.01)

(52) U.S. Cl. ............. 363/56.04; 323/284; 315/219

(58) Field of Classification Search .......... 323/222, 323/224, 282, 284, 285; 315/209 R, 219, 315/224, 226; 363/56.02, 56.03, 56.04, 56.07, 363/98, 132
See application file for complete search history.

(56) References Cited

U.S. PATENT DOCUMENTS

| | | | |
|---|---|---|---|
| 4,685,040 A * | 8/1987 | Steigerwald et al. | 363/17 |
| 5,030,887 A | 7/1991 | Guisinger | |
| 5,349,272 A | 9/1994 | Rector | |
| 5,475,284 A | 12/1995 | Lester et al. | |
| 5,485,057 A | 1/1996 | Smallwood et al. | |
| 5,563,473 A | 10/1996 | Mattas et al. | |
| 5,574,335 A | 11/1996 | Sun | |
| 5,712,776 A | 1/1998 | Palara et al. | |
| 5,936,360 A | 8/1999 | Kaneko | |
| 6,020,688 A | 2/2000 | Moisin | |
| 6,037,720 A | 3/2000 | Wong et al. | |
| 6,127,786 A | 10/2000 | Moisin | |
| 6,169,375 B1 | 1/2001 | Moisin | |
| 6,181,083 B1 | 1/2001 | Moisin | |
| 6,188,553 B1 | 2/2001 | Moisin | |
| 6,218,788 B1 | 4/2001 | Chen et al. | |
| 6,281,638 B1 | 8/2001 | Moisin | |
| 6,445,141 B1 | 9/2002 | Kastner et al. | |
| 6,459,215 B1 | 10/2002 | Nerone et al. | |
| 6,661,208 B2 * | 12/2003 | Rutter et al. | 323/224 |
| 6,674,268 B2 * | 1/2004 | Rutter et al. | 323/224 |
| 6,858,996 B2 * | 2/2005 | Green | 315/291 |
| 2002/0030451 A1 | 3/2002 | Moisin | |
| 2003/0117084 A1 | 6/2003 | Stack | |

* cited by examiner

*Primary Examiner*—Gary L Laxton
(74) *Attorney, Agent, or Firm*—Knobbe, Martens, Olson & Bear LLP

(57) ABSTRACT

A shoot-through prevention circuit is used in a power conversion circuit that uses a passive level-shifter to drive a P-type transistor in a switching network. The shoot-through prevention circuit is coupled between a controller output that provides a driving signal to control the P-type transistor and the passive level-shifter coupled to a control terminal of the P-type transistor. The shoot-through prevention circuit couples the controller output to the passive level-shifter when the driving signal has a first logic level associated with turning on the P-type transistor and isolates the controller output from the passive level-shifter when the driving signal has a second logic level associated with turning off the P-type transistor.

20 Claims, 2 Drawing Sheets

US 7,313,006 B2

SHOOT-THROUGH PREVENTION CIRCUIT FOR PASSIVE LEVEL-SHIFTER

CLAIM FOR PRIORITY

This application claims the benefit of priority under 35 U.S.C. § 119(e) of U.S. Provisional Application No. 60/680,883, filed on May 13, 2005, and entitled "Shoot-Through Prevention Circuit for Passive Level-Shifter," the entirety of which is incorporated herein by reference.

BACKGROUND

1. Field of the Invention

The invention generally relates to a power conversion circuit with a switching network, and more particularly, relates to a shoot-through prevention circuit in the power conversion circuit that uses a passive level-shifter in driving the switching network.

2. Description of the Related Art

Switching transistors are generally used in a switching network to selectively couple an output node to an input voltage or ground. It is common to use a P-type transistor between the input voltage and the output node and an N-type transistor between the output node and ground. To properly control the P-type transistor, a level-shift circuit is typically used to interface a driving signal to the P-type transistor.

One type of level-shift circuit is a passive level-shifter that includes a capacitor to couple the driving signal to the P-type transistor. The passive level-shifter may unintentionally cause the P-type transistor to conduct when the input voltage has transient spikes. If the N-type transistor is conducting when the P-type transistor accidentally turns on, both of the transistors conduct excessive/damaging current (or shoot-through current) as the input voltage is effectively shorted to ground.

SUMMARY

In one embodiment, the present invention proposes a power conversion circuit that includes a switching network (e.g., a half-bridge or a full-bridge switching circuit), a level-shifter and a shoot-through prevention circuit. The switching network includes at least a high-side (or upper) switch and a low-side (or lower) switch that selectively couples a source voltage to an output node. For example, the high-side switch is a P-type transistor that is coupled between the source voltage and the output node while the low-side switch is an N-type transistor coupled between the output node and a reference node (e.g., ground). In one embodiment, the P-type transistor is a metal-oxide-semiconductor field-effect-transistor (MOSFET) with a source terminal coupled to the source voltage and a drain terminal coupled to the output node.

Driving signals are provided by a controller to respectively control the high-side switch and the low-side switch for non-overlapping conduction. For example, the high-side switch and the low-side switch alternately conduct to generate an alternating current (AC) waveform at the output node. The level-shifter is coupled to a control terminal (e.g., a gate terminal) of the high-side switch and is configured to change a reference voltage of the first driving signal provided by a first controller output. In other words, the level-shifter changes the voltage levels associated with logic low and logic high in the first driving signal to properly control the high-side switch.

To prevent unintended conduction by both the high-side switch and the low-side switch at the same time, the shoot-through prevention circuit is coupled between the first controller output and the level-shifter. The shoot-through prevention circuit couples the first controller output to the level-shifter when the first driving signal is active (or has a first logic level associated with turning on the high-side switch) and isolates the first controller output from the level-shifter when the first driving signal is inactive (or has a second logic level associated with turning off the high-side switch). Isolating the first controller output from the level-shifter allows the control terminal of the high-side switch to follow any transients in the source voltage and avoid accidental conduction by the high-side switch when the first driving signal is inactive.

Logic low is generally associated with turning on a P-type transistor while logic high is associated with turning off the P-type transistor. In one embodiment, the shoot-through prevention circuit includes an N-type transistor (or semiconductor switch) coupled in parallel with an optional diode between the first controller output and the level-shifter. In an application using field-effect-transistors (FETs), the shoot-through prevention circuit uses an N-channel FET with a source terminal coupled to the first controller output, a drain terminal coupled to the level-shifter and a gate terminal coupled to a predetermined voltage (e.g., Vcc, a supply voltage or a voltage corresponding to logic high for the first driving signal). When the first driving signal at the first controller output is logic low (e.g., near or approximately ground or zero volt), the N-channel FET is on to connect the first controller output to the level-shifter. When the first driving signal is logic high (e.g., near or approximately the supply voltage), the N-channel FET is off to disconnect (or isolate) the first controller output from the level-shifter.

In another application using bipolar junction transistors (BJTs), the shoot-through prevention circuit uses an NPN transistor with an emitter coupled to the first controller output, a collector coupled to the level-shifter and a base coupled via a series resistor to a predetermined voltage that is approximately equal to a voltage associated with logic high of the first driving signal. Similar to the N-channel FET, the NPN transistor is on when the first driving signal is logic low and is off when the first driving signal is logic high.

In one embodiment, the level-shifter is a passive level-shifter with a capacitor coupled between the shoot-through prevention circuit and the control terminal of the high-side switch, a resistor coupled between the source voltage and the control terminal of the high-side switch and a zener diode coupled in parallel with the resistor. For example, the zener diode has a cathode coupled to the source voltage and an anode coupled to the control terminal of the high-side switch.

In one embodiment, the power conversion circuit is an inverter for driving lamps (e.g., fluorescent lamps) and further comprises a transformer with a primary winding coupled to the output node of the switching network and a secondary winding coupled to one or more lamps. The lamps, such as cold cathode fluorescent lamps (CCFLs), can be used for illumination in a backlight system. In another embodiment, the power conversion circuit is a switching power supply and further includes a low-pass filter (e.g., a capacitor) coupled to the output node of the switching network to generate an output voltage that is proportional to a duty cycle of the AC waveform at the output node.

Other applications using half-bridge or full-bridge switching circuits are possible. The half-bridge switching circuit generally uses one P-type transistor and one N-type transistor. The full-bridge switching circuit generally uses two P-type transistors and two N-type transistors. Each of the P-type transistors in the full-bridge switching circuit has a different passive level-shifter for coupling to separate controller outputs. Accordingly, separate shoot-through prevention circuits are used for each of the passive level-shifters.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

These drawings and the associated description herein are provided to illustrate embodiments and are not intended to be limiting.

DETAILED DESCRIPTION OF EMBODIMENTS

Although particular embodiments are described herein, other embodiments, including embodiments that do not provide all of the benefits and features set forth herein, will be apparent to those of ordinary skill in the art.

Figure 1:
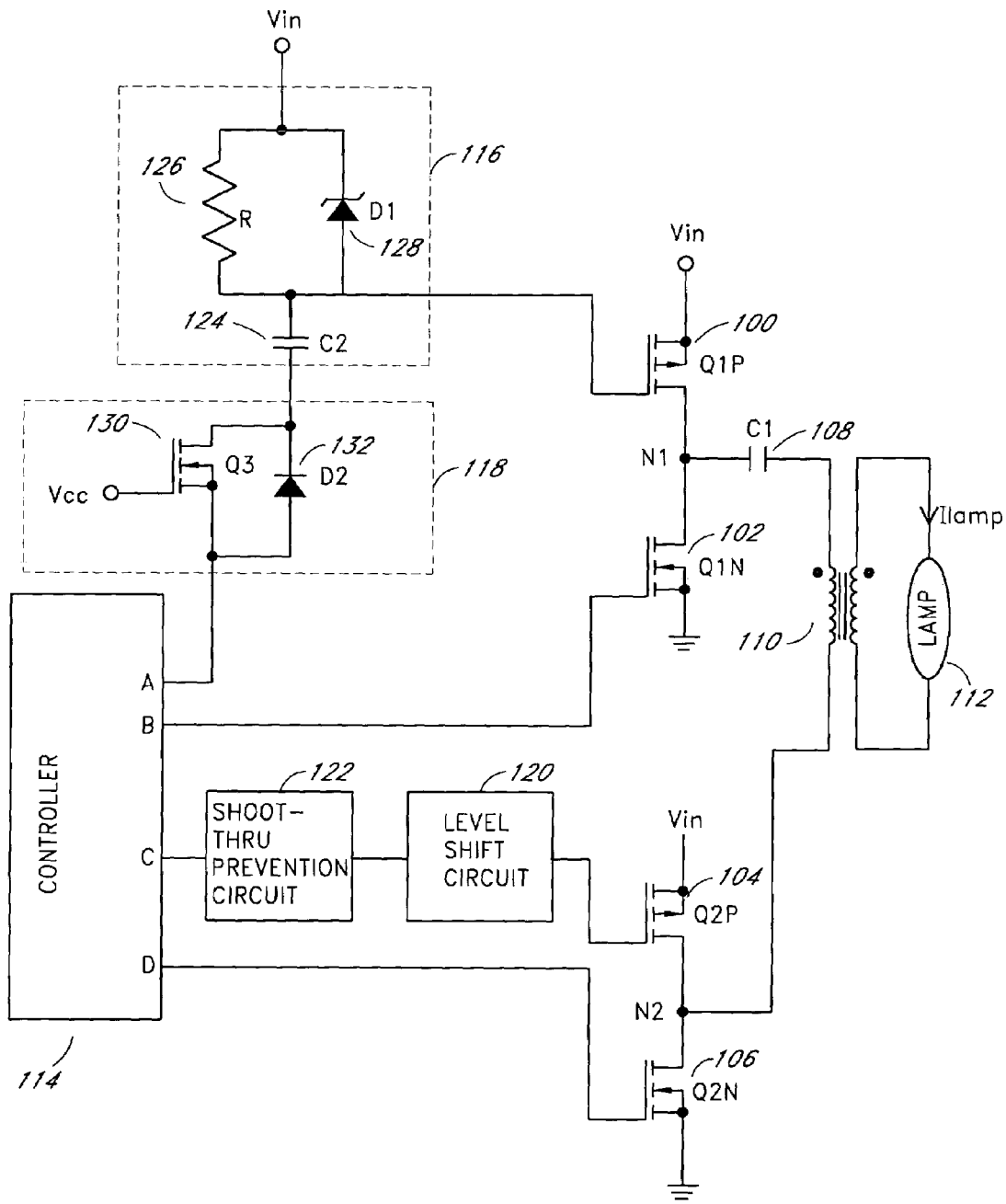
FIG. 1 illustrates one embodiment of a shoot-through prevention circuit and a power conversion circuit with a full-bridge switching network.

FIG. 1 illustrates one embodiment of a shoot-through prevention circuit 118 and a power conversion circuit with a full-bridge switching network. By way of example, the power conversion circuit is an inverter that converts a substantially direct current (DC) waveform to an AC waveform for driving a fluorescent lamp (e.g., a CCFL) 112. For example, the inverter accepts a DC input voltage (Vin) and produces a substantially sinusoidal AC current (Ilamp) that flows through the CCFL 112 to illuminate the CCFL 112.

The full-bridge switching network of the inverter in FIG. 1 is implemented with four switching transistors 100, 102, 104, 106. For example, the first switching transistor (Q1P) 100 is coupled between the input voltage and a first output node (N1), the second switching transistor (Q1N) 102 is coupled between the first output node and ground, the third switching transistor (Q2P) 104 is coupled between the input voltage and a second output node (N2), and the fourth switching transistor (Q2N) 106 is coupled between the second output node and ground. The inverter also includes a controller 114 and a transformer 110. The output nodes of the full-bridge switching network are coupled to opposite terminals of a primary winding of the transformer 110. In one embodiment, an AC coupling (or DC blocking) capacitor (C1) 108 is inserted between the first output node and the primary winding.

The controller 114 outputs control signals (A, B, C, D) to control on/off states of the respective switching transistors 100, 102, 104, 106. The switching transistors 100, 102, 104, 106 conduct in pairs to alternately couple terminals of the primary winding of the transformer 110 to the input voltage and to ground, thereby generating an AC drive signal across the primary winding. For example, the first switching transistor 100 and the fourth switching transistor 106 periodically conduct for a first duration to couple the input voltage across the primary winding in a first polarity while the second switching transistor 102 and the third switching transistor 104 periodically conduct for a second duration to couple the input voltage across the primary winding in a second (or opposite) polarity. A corresponding AC signal is produced across a secondary winding of the transformer 110, and the secondary winding is coupled across the CCFL 112.

In the embodiment shown in FIG. 1, the first switching transistor 100 and the third switching transistor 104 are P-MOSFETs (or P-type transistors). The second switching transistor 102 and the fourth switching transistor 106 are N-MOSFETs (or N-type transistors). To properly control the P-MOSFETs, level-shift circuits 116, 120 are inserted between controller outputs and respective gate (or control) terminals of the first switching transistor 100 and the third switching transistor 104. The controller is typically powered by a supply voltage with a predetermined level (e.g., Vcc) and generates the control signals for driving the switching transistors 100, 102, 104, 106 with reference to the supply voltage level. For example, voltage levels near zero volt are associated with logic low and voltage levels near the supply voltage level are associated with logic high for the control signals. In some applications, the input voltage provided to source terminals of the first switching transistor 100 and the third switching transistor 104 varies over a wide range and has a higher level than the supply voltage. The level-shift circuits 116, 120 change the voltage reference of the control signals for the first switching transistor 100 and the third switching transistor 104 to the input voltage level for proper operation.

One example of a level-shift circuit includes a capacitor (C2) 124, a resistor (R) 126 and a zener diode (D1) 128 as shown in the level-shift circuit 116 of FIG. 1. The capacitor 124 is coupled between the controller 114 and the gate terminal of the first switching transistor 100. The resistor 126 and the zener diode 128 are coupled in parallel between the gate terminal of the first switching transistor 100 and the input voltage. For example, the zener diode 128 has an anode coupled to the gate terminal of the first switching transistor 100 and a cathode coupled to the input voltage.

The level-shift circuit (or passive level-shifter) 116 described above is advantageously simple and cost efficient in comparison to other types of level-shift circuits implemented using integrated circuit devices, isolated pulse transformers or opto-coupling devices. However, the level-shift circuit 116 may cause shoot-through problems when the input voltage has transient spikes. For example, the level-shift circuit 116 provides a gate voltage to the gate terminal of the first switching transistor 100 with approximately the same level as the input voltage when the first switching transistor 100 is intended to be off. If the input voltage coupled to the source terminal of the first switching transistor 100 experiences a positive transient voltage, the first switching transistor 100 may undesirably (or unintentionally) turn on if the gate voltage fails to track the positive transient voltage.

In other words, the voltage across the capacitor 124 does not change instantaneously when the input voltage changes and the gate voltage may be sufficiently low to turn on the first switching transistor 100 while the voltage across the capacitor is transitioning (or charging) to a new value. If the second switching transistor 102 is on when the first switching transistor 100 unintentionally turns on, excessive/damaging current (or shoot-through current) flows through the first and the second switching transistors 100, 102 because the input voltage is effectively shorted to ground through the first and the second switching transistors 100, 102. The shoot-through current contributes to increased circuit noise and power loss. In inverter applications for backlight systems, brightness of lamps may also be affected by the shoot-through current.

To avoid shoot-through current, shoot-through prevention circuits 118, 122 are respectively inserted between the controller outputs and the level-shift circuits 116, 120. The shoot-through prevention circuits 118, 122 isolate (or disconnect) the controller 114 from the respective level-shift circuits 116, 120 when the first switching transistor 100 or the third switching transistor 104 is intended to be off. One example of a shoot-through prevention circuit includes a semiconductor switch and an optional diode coupled in parallel between a controller output and a level-shift circuit. The semiconductor switch connects the controller output to the level-shift circuit when an associated switching transistor is intended to be on and isolates the controller output from the level-shift circuit when the associated switching transistor is intended to be off. The isolation between the controller output and the level-shift circuit allows a control terminal of the switching transistor to follow transient changes in the input voltage and to avoid unintentional conduction by the switching transistor.

In the embodiment shown in FIG. 1, a semiconductor switch (Q3) 130 for the shoot-through prevention circuit 118 is implemented using an N-MOSFET with a gate terminal coupled to the supply voltage (Vcc), a source terminal coupled to the first control signal (A) provided by the controller 114 and a drain terminal coupled to the level-shift circuit 116 (or a first terminal of the capacitor 124). As discussed above, the supply voltage is used by the controller 114 to generate the control signals to drive the switching transistors 100, 102, 104, 106 and has a level corresponding to a logic high for the control signals. An optional diode (D2) 132 has an anode coupled to the source terminal and a cathode coupled to the drain terminal of the semiconductor switch 130.

When the first control signal has a first logic level (e.g., logic low) associated with turning on the first switching transistor 100, the semiconductor switch 130 is on to couple the first control signal to the gate terminal of the first switching transistor 100 via the level-shift circuit 116. For example, current flows through the semiconductor switch 130 to the capacitor 124 to pull-down the voltage at the gate terminal of the first switching transistor 100, thereby turning on the first switching transistor 100. The resistor 126 helps to establish a DC voltage at the gate terminal of the first switching transistor 100. The zener diode 128 in the level-shift circuit 116 has a breakdown voltage and clamps the voltage at the gate terminal of the first switching transistor 100 to a lower limit approximately equal to a difference between the input voltage and the breakdown voltage.

When the first control signal has a second logic level (e.g., logic high) associated with turning off the first switching transistor 100, the semiconductor switch 130 is off to isolate the first control signal from the level-shift circuit 116. For example, when the first control signal changes from logic low to logic high, the semiconductor switch 130 turns off and the voltage at the gate terminal of the first switching transistor 100 is pushed-up through a body diode of the semiconductor switch 130 or the optional diode 132, thereby turning off the first switching transistor 100. Any charge on the capacitor 124 is quickly discharged through the zener diode 128 to the input voltage and the voltage at the gate terminal of the first switching transistor 100 is approximately equal to the input voltage. The optional diode 132 is used to reduce the voltage drop across the shoot-through prevention circuit 118 while the capacitor 124 is discharging.

As discussed above, the input voltage at the source terminal of the first switching transistor 100 can experience transient spikes. For example, the input voltage may experience a transient step up from a lower voltage to a higher voltage when an AC-to-DC adapter is inserted, during pulse charging of a battery or other transient generating activities. The semiconductor switch 130 in the shoot-through prevention circuit 118 advantageously avoids shoot-through conditions associated with transient spikes in the input voltage by turning off when the first switching transistor 100 is intended to be off. The off state of the semiconductor switch 130 prevents current from flowing through the capacitor 124 to the controller 114 and thus allows the gate terminal of the first switching transistor 100 to follow changes in the input voltage.

Figure 2:
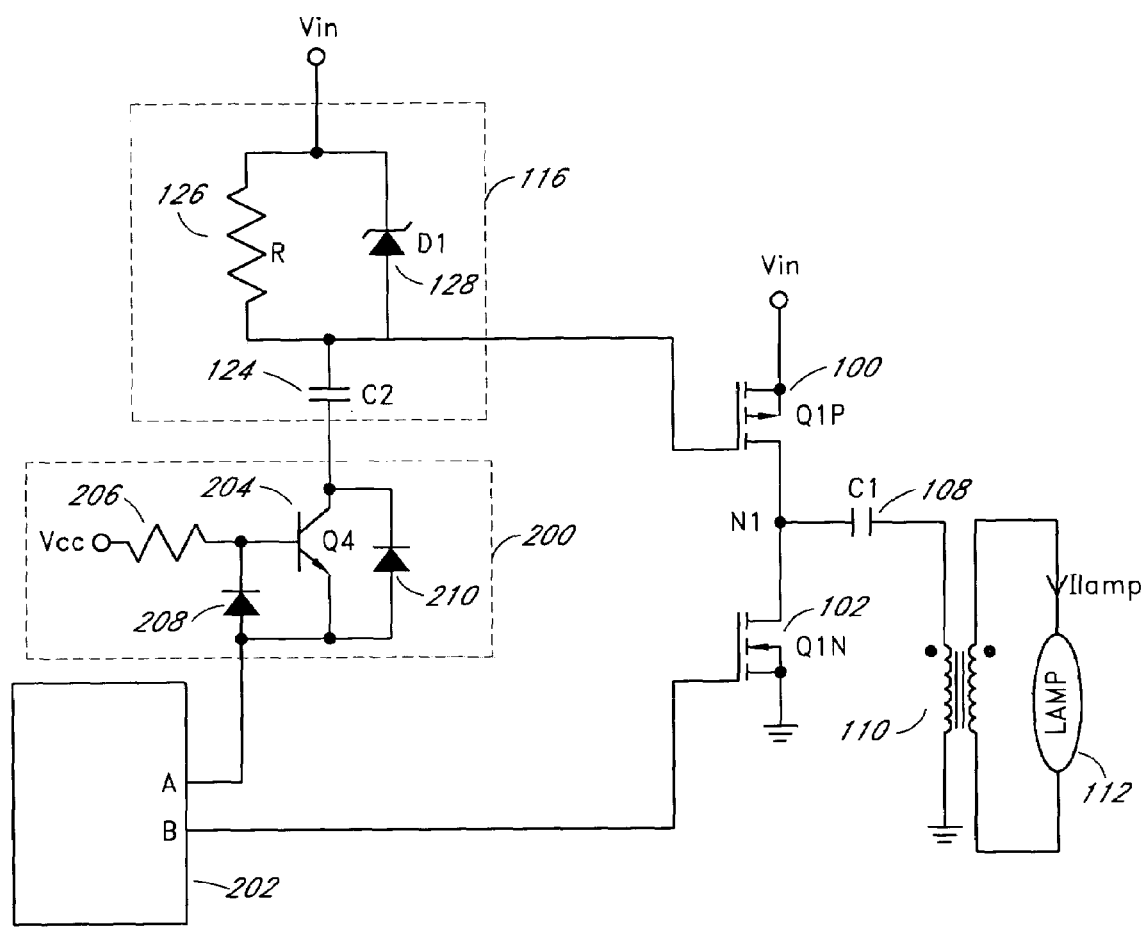
FIG. 2 illustrates another embodiment of a shoot-through prevention circuit and a power conversion circuit with a half-bridge switching network.

The semiconductor switch 130 in the shoot-through prevention circuit 118 of FIG. 1 is shown as an N-MOSFET. The semiconductor switch 130 can also be implemented using other semiconductor devices (e.g., a semiconductor relay, a BJT, a JFET and the like). Furthermore, other types of switching networks (e.g., a half-bridge switching circuit) can benefit from a shoot-through prevention circuit. By way of example, FIG. 2 illustrates one embodiment of a shoot-through prevention circuit 200 using a BJT as a semiconductor switch 204 and an inverter with a half-bridge switching network for driving a lamp 112.

The half-bridge switching network includes two semiconductor switches (or switching transistors) 100, 102 coupled to a primary winding of a transformer 110. For example, the first semiconductor switch (Q1P) 100 is a P-MOSFET with a source terminal coupled to an input voltage (Vin) and a drain terminal coupled to a common node (N1). The second semiconductor switch (Q1N) 102 is an N-MOSFET with a source terminal coupled to ground and a drain terminal coupled to the common node. The common node is coupled to a first terminal of the primary winding of the transformer 110 via an AC coupling capacitor (C1) 108. A second terminal of the primary winding of the transformer 110 is coupled to ground. The lamp 112 is coupled across a secondary winding of the transformer 110. The first and the second semiconductor switches 100, 102 alternately conduct to generate an AC waveform across the primary winding of the transformer 110 and a corresponding AC current (Ilamp) flows in the secondary winding of the transformer 110 to power the lamp 112.

Similar to the embodiment shown in FIG. 1, a passive level-shifter 116 is used to interface a first driving signal (e.g., A) provided by a first output of a controller 202 to a gate terminal of the first semiconductor switch 100. The second semiconductor switch 102 is controlled by a second driving signal (e.g., B) provided by another output of the controller 202. To prevent shoot-through conditions in which the first semiconductor switch 100 unintentionally turns on while the second semiconductor switch 102 is conducting, the shoot-through prevention circuit 200 is coupled between the first output of the controller 202 and the passive level-shifter 116.

As described above, the semiconductor switch (Q4) 204 in the shoot-through prevention circuit 200 is realized with a BJT. The semiconductor switch (e.g., an NPN transistor) 204 has an emitter coupled to the first output of the controller 202, a base coupled to a predetermined voltage (e.g., Vcc) through a series resistor 206 and a collector coupled to the passive level-shifter 116 (or a first terminal of the capacitor 124). In the embodiment shown in FIG. 2, a clamping diode 208 has an anode coupled to the emitter and a cathode coupled to the base of the semiconductor switch 204 to limit a reverse bias of the base-emitter junction. In addition, a diode 210 has an anode coupled to the first output of the controller 202 and a cathode coupled to the passive level-shifter 116 to provide a low-voltage path when the first driving signal transitions from an active state (e.g., logic low) to an inactive state (e.g., logic high).

Similar to the semiconductor switch 130 in the shoot-through prevention circuit 118 of FIG. 1, the semiconductor switch 204 is on to couple the first controller output to the passive level-shifter 116 when the first driving signal has a first logic level (e.g., logic low) associated with turning on the first semiconductor switch 100. For example, logic low (or approximately zero volt) at the emitter of the semiconductor switch 204 forward biases the base-emitter junction of the semiconductor switch 204 to turn on the semiconductor switch 204. The semiconductor switch 204 is off to isolate the first controller output from the passive level-shifter 116 when the first driving signal has a second logic level (e.g., logic high) associated with turning off the first semiconductor switch 100. For example, logic high (or approximately Vcc) at the emitter of the semiconductor switch 204 is not sufficient to forward bias the base-emitter junction to turn on the semiconductor switch 204.

Various embodiments have been described above. Although described with reference to these specific embodiments, the descriptions are intended to be illustrative and are not intended to be limiting. For example, FIGS. 1 and 2 have been described with reference to inverter applications for backlight systems. Other applications (e.g., switching power supplies) with switching networks can take also benefit from the shoot-through prevention circuit. Thus, various modifications and applications may occur to those skilled in the art without departing from the true spirit and scope of the invention as defined by the appended claims.

What is claimed is:

1. A power conversion circuit comprising:
    a switching network comprising at least a high-side switch and a low-side switch configured to selectively couple a source voltage to an output node, wherein the high-side switch is a P-type transistor coupled between the source voltage and the output node;
    a level-shifter coupled to a control terminal of the high-side switch, wherein the level-shifter is configured to change a voltage reference of a driving signal provided by a controller output to control the high-side switch; and
    an electronic circuit coupled between the controller output and the level-shifter, wherein the electronic circuit comprises a semiconductor switch and prevents shoot-through current by closing the semiconductor switch to couple the controller output to the level-shifter when the driving signal at the controller output has a first logic level and opening the semiconductor switch to isolate the controller output from the level-shifter when the driving signal at the controller output has a second logic level.

2. The power conversion circuit of claim 1, wherein the semiconductor switch comprises an N-channel field-effect-transistor with a source terminal coupled to the controller output, a drain terminal coupled to the level-shifter and a gate terminal coupled to a predetermined voltage.

3. The power conversion circuit of claim 1, wherein the semiconductor switch comprises an NPN bipolar junction transistor with an emitter coupled to the controller output, a collector coupled to the level-shifter and a based coupled to a predetermined voltage through a series base resistor.

4. The power conversion circuit of claim 1, wherein the electronic circuit further comprises a diode coupled in parallel with the semiconductor switch between the controller output and the level-shifter.

5. The power conversion circuit of claim 1, wherein the first logic level corresponds to a logic low associated with turning on the high-side switch and the second logic level corresponds to a logic high associated with turning off the high-side switch.

6. A power conversion circuit comprising:
    a switching network comprising at least a high-side switch and a low-side switch configured to selectively couple a source voltage to an output node, wherein the high-side switch is a P-type transistor coupled between the source voltage and the output node;
    a level-shifter coupled to a control terminal of the high-side switch, wherein the level-shifter is configured to change a voltage reference of a driving signal provided by a controller output to control the high-side switch; and
    an electronic circuit coupled between the controller output and the level-shifter, wherein the electronic circuit prevents shoot-through current by coupling the controller output to the level-shifter when the driving signal has a first logic level and isolating the controller output from the level-shifter when the driving signal has a second logic level, wherein the level-shifter comprises:
        a capacitor coupled between the electronic circuit and the control terminal of the high-side switch;
        a resistor coupled between the source voltage and the control terminal of the high-side switch; and
        a zener diode with a cathode coupled to the source voltage and an anode coupled to the control terminal of the high-side switch.

7. The power conversion circuit of claim 1, wherein the P-type transistor is a metal-oxide-semiconductor field-effect-transistor with a source terminal coupled to the source voltage, a drain terminal coupled to the output node and a gate terminal coupled to the control terminal.

8. The power conversion circuit of claim 1, wherein the switching network is a half-bridge or a full-bridge switching circuit.

9. The power conversion circuit of claim 1, wherein the high-side switch and the low-side switch alternately conduct to generate an alternating current waveform at the output node of the switching network.

10. The power conversion circuit of claim 9, further comprising a transformer with a primary winding coupled to the output node of the switching network and a secondary winding coupled to a lamp.

11. The power conversion circuit of claim 9, further comprising a low-pass filter coupled to the output node of the switching network to generate an output voltage with a voltage level that is proportional to a duty cycle of the alternating current waveform.

12. A method to prevent shoot-through in a switching network of a power conversion circuit, the method comprising:
    using a level-shifter to change a voltage reference of a driving signal provided by a controller output that controls a P-type transistor in the switching network;
    using a semiconductor switch to selectively couple the controller output to the level-shifter;

closing the semiconductor switch to couple the controller output to the level-shifter when the driving signal has a first logic level; and opening the semiconductor switch to isolate the controller output from the level-shifter when the driving signal has a second logic level.

13. The method of claim 12, wherein the first logic level is associated with turning on the P-type transistor and the second logic level is associated with turning off the P-type transistor.

14. A method to prevent shoot-through in a switching network of a power conversion circuit, the method comprising:

using a level-shifter to change a voltage reference of a driving signal provided by a controller output that controls a P-type transistor in the switching network, wherein the level-shifter comprises:
  a capacitor coupled between the controller output and the P-type transistor; and
  a resistor and a diode coupled in parallel between an input voltage and the P-type transistor;
coupling the controller output to the level-shifter when the driving signal has a first logic level; and
isolating the controller output from the level-shifter when the driving signal has a second logic level.

15. The method of claim 12, wherein the switching network is a half-bridge circuit with an additional N-type transistor that alternating conducts with the P-type transistor to generate an alternating current waveform at an output of the switching network.

16. The method of claim 12, wherein the switching network is a full-bridge circuit with two P-type transistors and each of the P-type transistors has a different level-shifter for coupling to separate controller outputs.

17. The method of claim 12, wherein the P-type transistor is a field-effect-transistor with a source terminal coupled to an input voltage, a drain terminal coupled to an output terminal of the switching network and a gate terminal coupled to the level-shifter.

18. A power conversion circuit comprising:
  means for level-shifting a driving signal to control a P-type transistor in a switching network;
  means for selectively coupling the driving signal to the means for level-shifting the driving signal when the driving signal has a first predetermined logic level corresponding to an on-state of the P-type transistor; and
  means for selectively isolating the driving signal from the means for level-shifting the driving signal when the driving signal has a second predetermined logic level corresponding to an off-state of the P-type transistor.

19. The power conversion circuit of claim 18, further comprising means for generating an alternating current waveform at an output of the switching network.

20. The power conversion circuit of claim 19, wherein the alternating current waveform is coupled through a transformer to drive one or more fluorescent lamps in a backlight system.

* * * * *